(12) United States Patent
Ramspacher et al.

(10) Patent No.: US 9,677,681 B1
(45) Date of Patent: Jun. 13, 2017

(54) SHAPE MEMORY ACTUATED NORMALLY OPEN PERMANENT ISOLATION VALVE

(71) Applicant: The United States of America, as represented by the Administrator of the National Aeronautics and Space Administration, Washington, DC (US)

(72) Inventors: Daniel J. Ramspacher, Washington, DC (US); Caitlin E. Bacha, Bowie, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 198 days.

(21) Appl. No.: 14/211,136

(22) Filed: Mar. 14, 2014

(51) Int. Cl.
*F16K 17/14* (2006.01)
*F16K 31/02* (2006.01)
*F16K 31/46* (2006.01)
*F02K 9/00* (2006.01)

(52) U.S. Cl.
CPC ............ *F16K 31/025* (2013.01); *F16K 31/46* (2013.01); *F02K 9/00* (2013.01)

(58) Field of Classification Search
CPC ................................. F16K 31/025; F02K 9/00
USPC .......................... 137/68.11, 68.12, 68.14, 71
See application file for complete search history.

(56) References Cited

U.S. PATENT DOCUMENTS

| | | | |
|---|---|---|---|
| 4,836,496 A * | 6/1989 | Abujudom | F16K 31/025 251/11 |
| 2010/0122735 A1* | 5/2010 | Schramm | F16K 17/1613 137/68.19 |

\* cited by examiner

*Primary Examiner* — Kevin Lee
*Assistant Examiner* — P. Macade Nichols

(57) ABSTRACT

A valve assembly for an in-space propulsion system includes an inlet tube, an outlet tube, a valve body coupling the inlet tube to the outlet tube and defining a propellant flow path, a valve stem assembly disposed within the valve body, an actuator body coupled to the valve body, the valve stem assembly extending from an interior of the valve body to an interior of the actuator body, and an actuator assembly disposed within the actuator body and coupled to the valve stem assembly, the actuator assembly including a shape memory actuator member that when heated to a transition temperature is configured to enable the valve stem assembly to engage the outlet tube and seal the propellant flow path.

18 Claims, 12 Drawing Sheets

SHAPE MEMORY ACTUATED NORMALLY OPEN PERMANENT ISOLATION VALVE

ORIGIN OF INVENTION

Invention by Government Employee(s) Only

The invention described herein was made by an employee of the United States Government, and may be manufactured and used by or for the Government for governmental purposes without the payment of any royalties thereon or therefor.

FIELD

The aspects of the present disclosure relate generally to permanent isolation valves for spacecraft fluid systems and, in particular, to a zero-leak permanent isolation valve for liquid propellant service in space propulsion systems.

BACKGROUND

Normally open permanent isolation valves are essential components for in-space propulsion systems. Pre-actuation, the valves must permit propellant flow. When actuated, the valves must permanently isolate sections of the propellant system that are no longer in use, preventing propellant leakage.

Potential leaks that form in a propulsion system, particularly in sections that are no longer in use, allow the propellant to escape from the system into space. These leaks limit the spacecraft performance by decreasing the system feed pressure and wasting propellant that could be used for future maneuvers, thereby shortening the mission life. Depending upon the system design, leaks could cause unwanted engine firings, crippling and potentially prematurely ending the space mission. To mitigate this liability, normally open valve assemblies are closed, permanently isolating the sections of the propulsion system downstream of the valves from the upstream propellant with a zero-leak seal. Prior to actuation, the valve allows for the flow of propellant with little pressure drop, enabling the system to operate with little or no decrease in performance.

The current aerospace industry standard for this type of valve is the pyrovalve. Pyrovalves use explosives to achieve this purpose. However, despite its widespread usage in spacecraft fluid systems, pyrovalve qualification testing has yielded unacceptably high failure rates. In some cases, the valves do not close completely. In other cases, the primary explosive fails to ignite the redundant explosive, or the explosive charges burn through the valve body. Stress corrosion is also a problem, with cracking occurring at the fillet weld of the valve.

Nickel titanium, also known as "nitinol", is a nickel and titanium metal alloy. Two properties exhibited by nitinol include shape memory and superelasticity. Shape memory, as is generally understood, is the ability of the metal alloy to undergo deformation at one temperature, and then recover its original, undeformed shape upon heating above its transformation temperature. Nitinol is a shape memory alloy that can produce up to 350 MPa of pressure to recover up to 8% strain. Nitinol can be compressed at room temperature and will recover its original shape at a transition temperature of approximately 80 degrees Centigrade. The transition temperature can be controlled by variations in the composition of the alloy. Nitinol is used as an actuator in aerospace industry components such as pin pullers and bolt cutters.

Accordingly, it would be advantageous to provide a non-explosive permanent isolation valve for spacecraft fluid systems that overcomes the problems described above.

BRIEF DESCRIPTION OF THE DISCLOSED EMBODIMENTS

As described herein, the exemplary embodiments overcome one or more of the above or other disadvantages known in the art.

One aspect of the exemplary embodiments relates a valve assembly for an in-space propulsion system. In one embodiment the valve assembly includes an inlet tube, an outlet tube, a valve body coupling the inlet tube to the outlet tube and defining a propellant flow path, a valve stem assembly disposed within the valve body, an actuator body coupled to the valve body, the valve stem assembly extending from an interior of the valve body to an interior of the actuator body, and an actuator assembly disposed within the actuator body and coupled to the valve stem assembly, the actuator assembly including a shape memory actuator member that when heated to a transition temperature is configured to enable the valve stem assembly to engage the outlet tube and seal the propellant flow path.

Another aspect of the disclosed embodiments relates to a normally open shape memory valve assembly for a spacecraft fluid system. In one embodiment, the valve assembly includes a valve body defining a fluid flow path between an inlet and an outlet, an actuator body coupled to the valve body, an actuator tube and a shape memory alloy retained within the actuator tube being disposed in the actuator body, a valve stem assembly extending from an interior of the valve body into an interior of the actuator body, the valve stem assembly including a stem cap, a seat member, and a stem shaft coupled between the stem cap and the seat member, a spring member disposed on the stem shaft, the spring member being configured to be retained in a compressed state between the valve body and the seat member, a first end of the actuator tube being coupled to the stem cap and a second end of the actuator tube being coupled to the actuator body, and a heater member retained within the actuator tube adjacent to the shape memory alloy, the heater member configured to heat the shape memory alloy to allow the shape memory alloy to expand and separate the first end of the actuator tube from the second end, enabling the spring member to drive the seat member against the outlet and seal the flowpath.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

FIGS. 11A-11C illustrate one embodiment of an outlet tube for a valve assembly incorporating aspects of the present disclosure, the inlet tube being substantially similar.

DETAILED DESCRIPTION OF THE EXEMPLARY EMBODIMENTS OF THE DISCLOSURE

Figure 1:
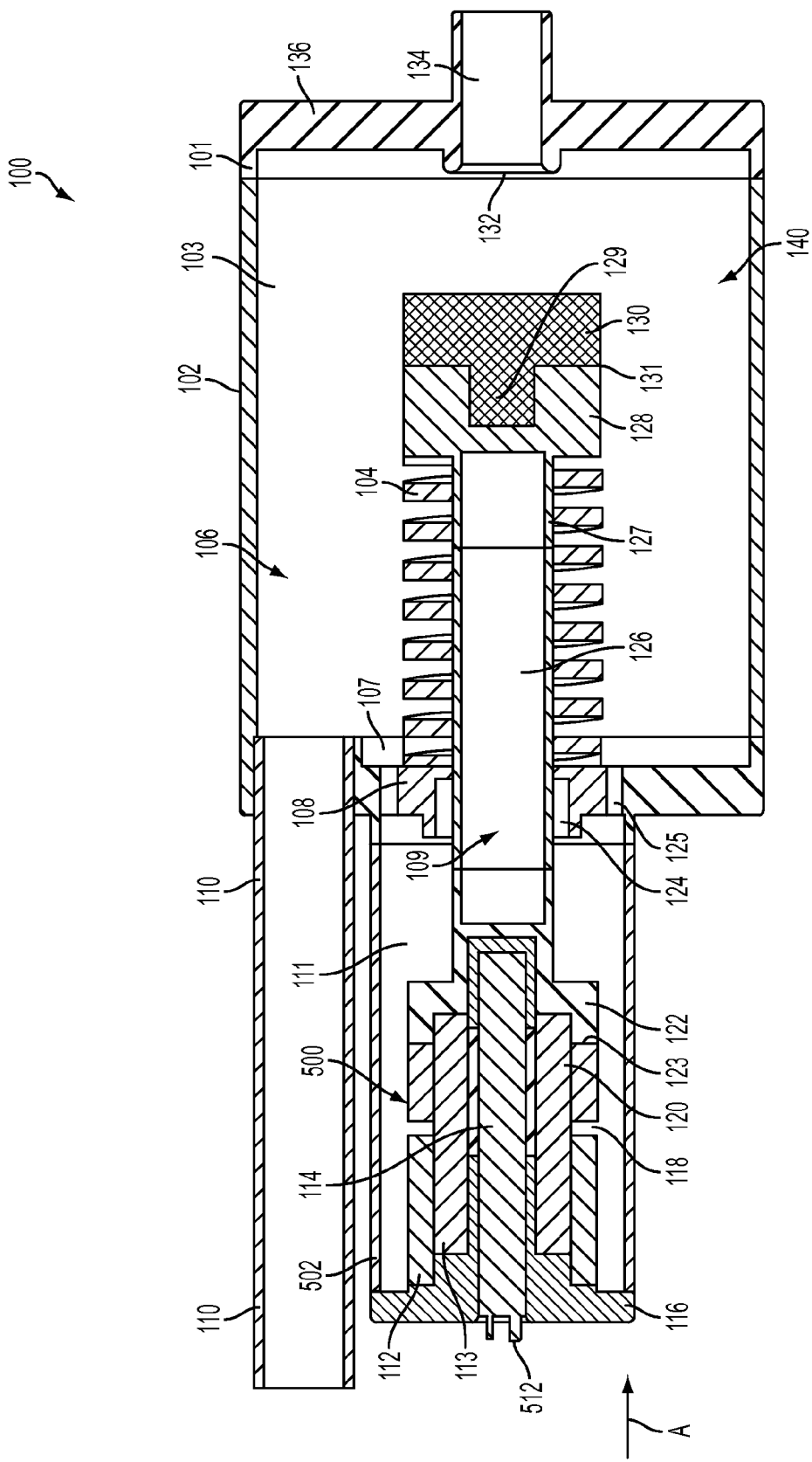
FIG. 1 illustrates a cross-sectional view of one embodiment of a valve assembly incorporating aspects of the present disclosure.

Referring to FIG. 1, a cross-sectional schematic view of one embodiment of a shape memory activated valve assembly 100 for a spacecraft fluid or in-space propulsion system is illustrated. The aspects of the disclosed embodiments are directed to a normally open valve assembly ("NOVA") that utilizes a shape memory alloy to limit and seal the propellant leak path through the valve assembly 100. The valve assembly 100 of the disclosed embodiments is configured to provide a zero-leak permanent isolation valve for liquid propellant service in an in-space propulsion system. By utilizing the safe and effective properties of a shape memory alloy such as nitinol, the sealing of the valve assembly 100 is accomplished without the use of dangerous and unreliable explosives. In the examples described herein, valve assembly 100 will be described as a nitinol-actuated normally open valve assembly ("NA-NOVA"). In alternate embodiments, any suitable shape memory alloy can be used. Although the embodiments disclosed herein will be described with reference to the drawings, it should be understood that the embodiments disclosed herein can be embodied in many alternate forms. In additional any suitable size, shape or type of elements or materials could be used.

FIG. 1 illustrates one embodiment of the valve assembly 100 in a pre-actuation state. The valve assembly 100 of the disclosed embodiments generally comprises a cylindrical valve cavity or tube 102, valve stem assembly 106, inlet tube 110, an actuator assembly 500 and an outlet tube 134. The valve stem assembly 106 generally comprises a stem cap 122, stem shaft 126, spring cap 128 and seat or seal 130. The actuator assembly 500 generally includes an actuator cavity body 502, actuator tube 112 and heater element 114. A deflected, preloaded compression spring member 104 is positioned between the seat 130 of the valve stem shaft 122 and an inlet valve plate 108. Within the actuator tube 112 is a shape memory alloy actuator member 120 and the heater element 114.

In the example shown in FIG. 1, the stem shaft 126 of the valve stem assembly 106 begins in the actuator tube 112 and continues through a linear bushing 124 in the inlet valve plate 108. The stem shaft 12 extends into the valve cavity 102.

Prior to actuation, the valve stem assembly 106 is set away from the outlet tube 134 to allow sufficient fluid flow through the valve assembly 100. The separation allows sufficient flow with minimal pressure drop through the valve assembly 100. In one embodiment, prior to actuation, the valve assembly 100 allows propellant flow with a pressure drop of less than approximately 3 psi at a flow rate of approximately 0.15 kg/s.

In one embodiment, the actuator tube 112 includes a notch or notched section 118. The notch 118 ensures a clean fracture with no particulate when the shape memory actuator 120 expands. In this example, the actuator tube 112 is a notched tube connected at one end 123 to the stem shaft 126 by the stem cap 122. The other end 113 of the actuator tube 112 is welded to the actuator end cap 116, fixing the initial deflection and subsequent preload of the spring member 104. In the embodiment shown in FIG. 1, the shape memory actuator 120 is concentric to and surrounded by the actuator tube 112.

The linear bushing 124 is fixed into a large hole 109 in the inlet valve plate 108, generally with an interference fit. The linear bushing 124 limits the radial float of the stem shaft 126 during actuation, ensuring that the stem shaft 126 remains centered relative to an outlet interface 132 in an outlet valve plate 136 at the outlet tube 134 end of the valve assembly 100. The hole 109 acts as a guide for the stem shaft 126, limiting the lateral float of the stem shaft 126 relative to the outlet interface 132.

In one embodiment, smaller through-holes 125 are bored in the inlet valve plate 108, connecting the actuator tube 112 to the valve cavity 102 and allowing the pressurized propellant to file a void 111 with the actuator tube 112. The through-holes 125 enable the pressurized incompressible propellant to fill the void 111 behind the valve stem assembly 106, balancing the hydrostatic force on the front end 140 of the valve stem assembly 106. Without the through-holes 125, a hydrostatic force would be exerted on the valve stem assembly 106 as it drives toward the outlet tube 134 that is substantially equal to the product of the operating pressure and the cross-sectional area of the stem cap 122. In one embodiment, the operating pressure is less than or equal to approximately 500 psia.

Once the shape memory actuator 120 is actuated or activated, and expands to or towards its recovered state, the notch 118 in the actuator tube 112 fractures. The spring 104 begins to drive the valve stem assembly 106 towards the outlet interface 132 in the outlet valve plate 136. Since the hydrostatic force on the front end 140 of the valve stem assembly 106 is balanced, the valve stem assembly 106 does not experience any counteracting hydrostatic force.

In one embodiment, the shape memory actuator member 120 comprises a compressed piece of nitinol, or nitinol member, inside the valve assembly 100. The actuator member 120 is heated when actuation is desired. By virtue of the properties of a shape memory alloy such as nitinol, when heated, the actuator member 120 recovers to its original shape. This actuation or recovery of the actuator member 120 closes the valve assembly 100, creating a leak-tight seal. In one embodiment, the leak-tight seal can provide a leak rate of less than approximately $10^{-6}$ seconds (0.000001 seconds).

Actuation of the actuator member 120 is triggered by applying a voltage to the heater 114, which heats the actuator member 120. As shown in FIG. 1, power can be applied to leads 512 of the heater 114. In alternate embodiments, power can be applied in any suitable manner. Power is only applied to the valve assembly 100 during the actuation to heat the actuator member 120. In one embodiment, the power is generally less than approximately 60 watts (W) at a voltage of less than approximately 28 volts (V), resulting in a total amount of energy of less that approximately 0.01 watt-hours (Wh).

Figure 2:
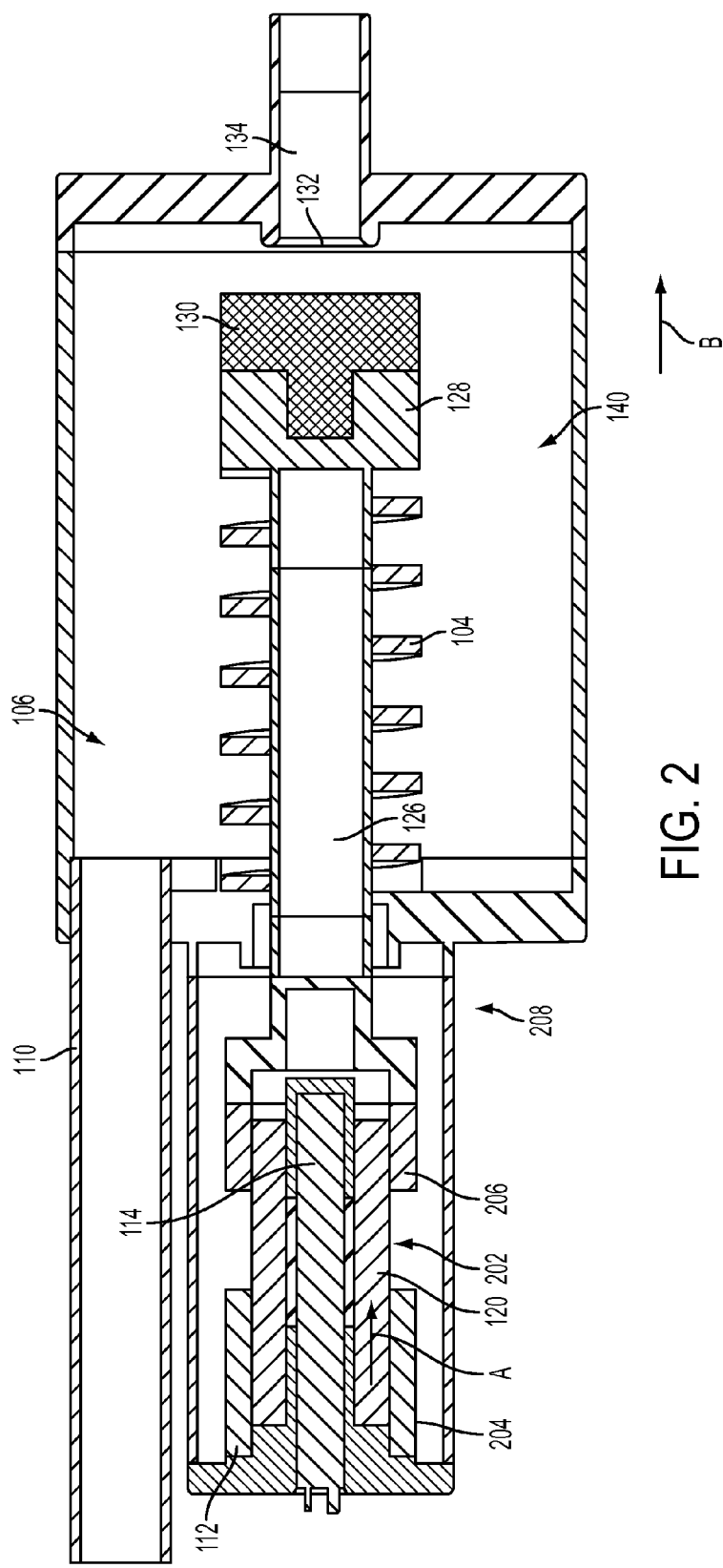
FIG. 2 illustrates a cross-sectional view of one embodiment of a valve assembly incorporating aspects of the present disclosure, where the notched section is fractured.

Once the actuator member 120 reaches its transition temperature, which in this example is approximately 80 degrees Centigrade, the actuator member 120 begins to expand. As the actuator member 120 begins to expand, the axial length of the actuator member 120 increases due to the recovery. As the axial length of the actuator member 120 increases or expands, the recovering actuator member 120 applies a force, generally an axial force generally indicated by arrow A, to the actuator tube 112. The recovering actuator member 120 continues to apply a force with an increasing magnitude as it recovers to its original, pre-compression size. The expansion of the actuator member 120 generally forces the actuator tube 112 to elongate. In one embodiment, the recovering actuator member 120 may also apply a radial force. Referring to FIG. 2, eventually, enough force is applied to the actuator tube 112 to cause the notched section 118 of the actuator tube 112 to break or fracture. In one embodiment, the force required to fracture the notched section 118 of the actuator tube 112 is in the range of approximately 750 lbf to and including 2144 lbf.

When the notched section 118 fractures, the spring member 104 begins to drive the stem shaft 126 towards the outlet tube 134 in the direction indicated by arrow B. The example of FIG. 1 shows the valve assembly 100 prior to actuation, or before power is applied to the heater 114. FIG. 2 illustrates an embodiment of the valve assembly 100 after the transition temperature of the actuator member 120 has been reached and the notched section 118 has fractured, driving the stem shaft 126 towards the outlet tube 134. FIG. 2 shows the axial expansion of the spring member 104 from its pre-actuation, compressed state.

In the example illustrated in FIG. 2, the fracture of the notched section 118 of the actuator tube 112 is generally represented by the opening 202. In one embodiment, the notched section 118 is configured to break cleanly, without any particulates. The fracture frees the stem shaft 126, spring cap 128, also referred to as a poppet, and forward piece 204 of the actuator tube 112 from the aft piece 206 of the actuator tube 112, still attached to the end 208 of the valve stem assembly 106.

Figure 3:
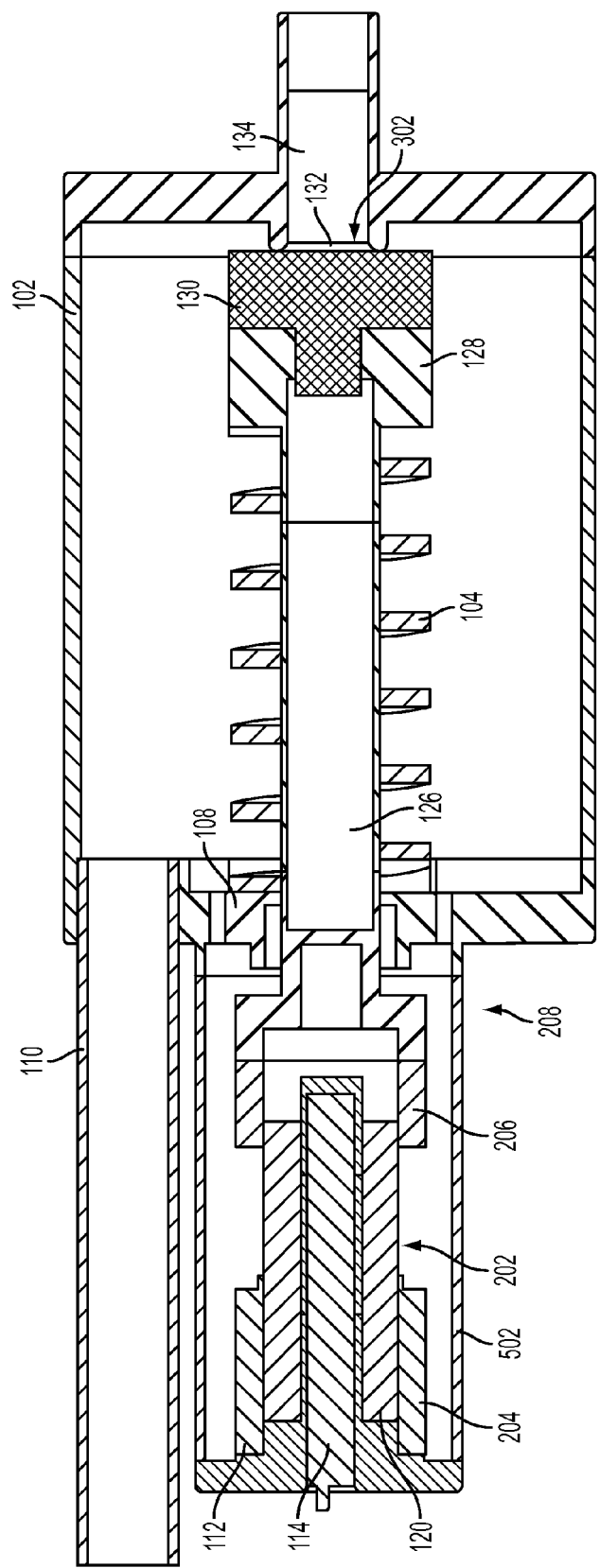
FIG. 3 illustrates a cross-sectional view of one embodiment of a valve assembly incorporating aspects of the present disclosure, where notched section is fractured and the outlet is sealed.

Referring to FIG. 3, as the actuator member 120 expands, the pro-loaded spring member 104 forces the spring cap 128 with seat member 130 against the outlet tube interface 132 of the valve assembly 100. This permanently isolates the downstream side of the valve assembly 100 from the upstream side. In this example, the downstream side can be considered the outlet tube 134, while the upstream side can include the inlet tube 110, valve cavity 102 and actuator body 502. The seat member 130, which in this example comprises a fluorinated ethylene propylene ("FEP") seat, provides a malleable surface that conforms to a size of the opening 302 of the outlet tube 134. As the pre-loaded spring member 104 forces the seat member 130 against the outlet tube interface 132, the seat member 130 is compressed against the opening 302. This compression creates a leak tight seal and permanently isolates the downstream section of the valve assembly 100 from the upstream section of the valve assembly 100. Although the seat member 130 will generally be referred to as comprising an FEP material, in alternate embodiments any suitable seat material can be used, including, but not limited to, soft materials such as Teflon, gold, copper or soft and precious metals. The seat member 130 of the disclosed embodiments provides a seal that maintains its integrity for a long duration.

After the valve assembly 100 is actuated, the propellant remains upstream of the seat member 130. In one embodiment, the propellant downstream of the seat member 130, or in the outlet tube 134, is evacuated. This leaves pressurized propellant upstream of the seat member 130, or in the valve body 102 and inlet tube 110. Thus, there is pressurized propellant upstream and a vacuum downstream of the seat member 130. The incompressible propellant will apply a hydrostatic force on the seat member 130 against the opening 302 of the outlet tube 134, enhancing the sealing force provided by the spring member 104.

Figure 4:
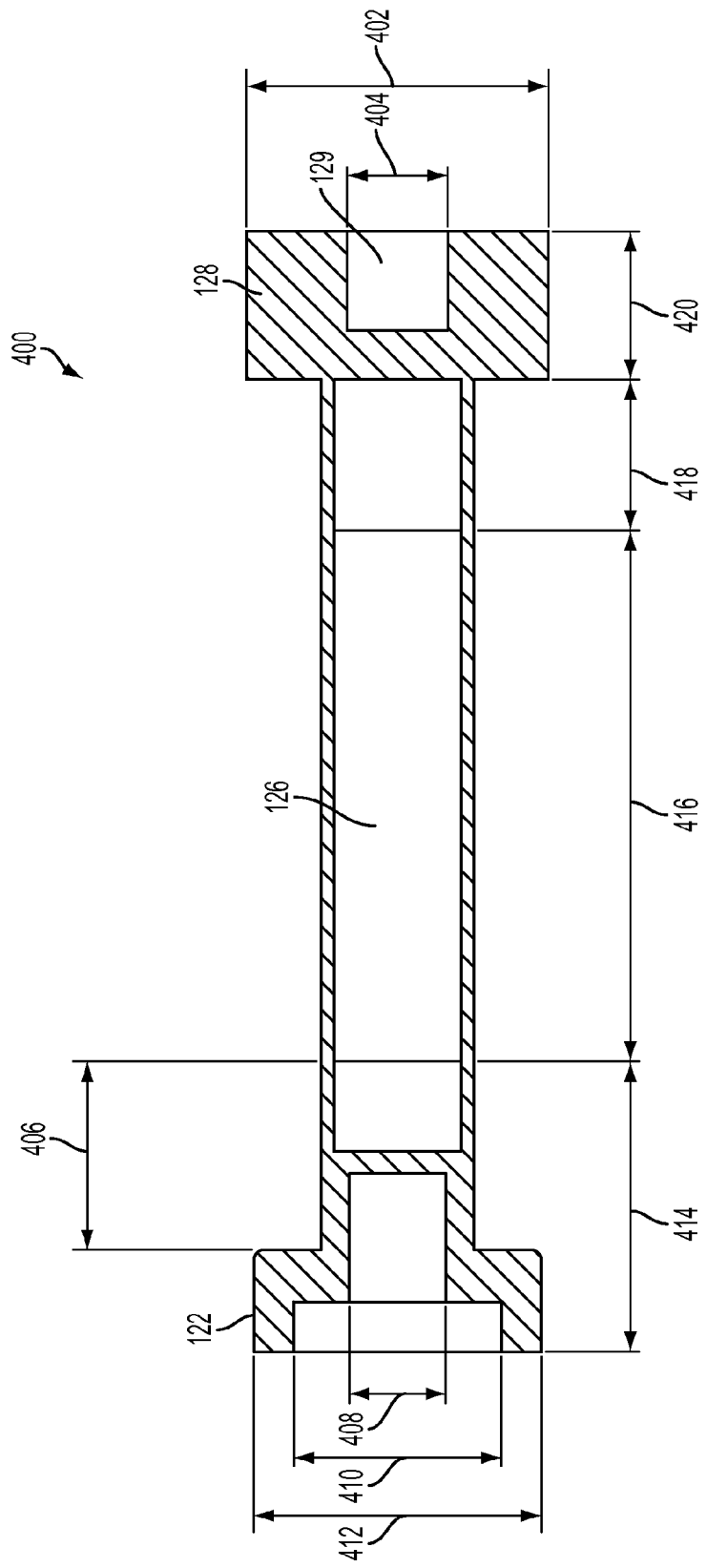
FIG. 4 illustrates a cross-sectional view of one embodiment of a valve stem assembly incorporating aspects of the present disclosure.

FIG. 4 illustrates one embodiment of a valve stem assembly 400 for the valve assembly. The valve stem assembly 400 comprises three parts, the stem cap 122, the stem shaft 126 and the spring cap 128. In this example, the stem cap 122 is attached at one end of the stem shaft and the spring cap 128 at the other end. In this example, the materials of the valve stem assembly 400 generally comprise titanium and the stem shaft 126 is welded to the stem cap 122 at one end and the spring cap 128 at the other end. The stem shaft 126 is configured according to Gaseous Tungsten Arc Welding (GTAW) constraints. The total welded length of the stem shaft 126 is equal to the sum of the post actuation length of the spring 104, the thickness of the inlet valve plate 108 and some additional clearance to ensure that the stem cap 122 does not contact the back of the inlet valve plate 108. The post actuation length of the spring 104 can be approximately 2.148 inches, while the thickness of the inlet valve plate 108 can be approximately 0.2 inches. The additional clearance can be approximately 0.1 inches.

The table below lists exemplary dimensions for the embodiment of the valve stem assembly illustrated in FIG. 4. The dimensions are approximate and in inches.

| | |
|---|---|
| 402 | 0.750 |
| 404 | 0.250 |
| 406 | 0.475 |
| 408 | 0.233 |
| 410 | 0.515 |
| 412 | 0.715 |
| 414 | 0.725 |
| 416 | 1.334 |
| 418 | 0.375 |
| 420 | 0.375 |

Figure 5:
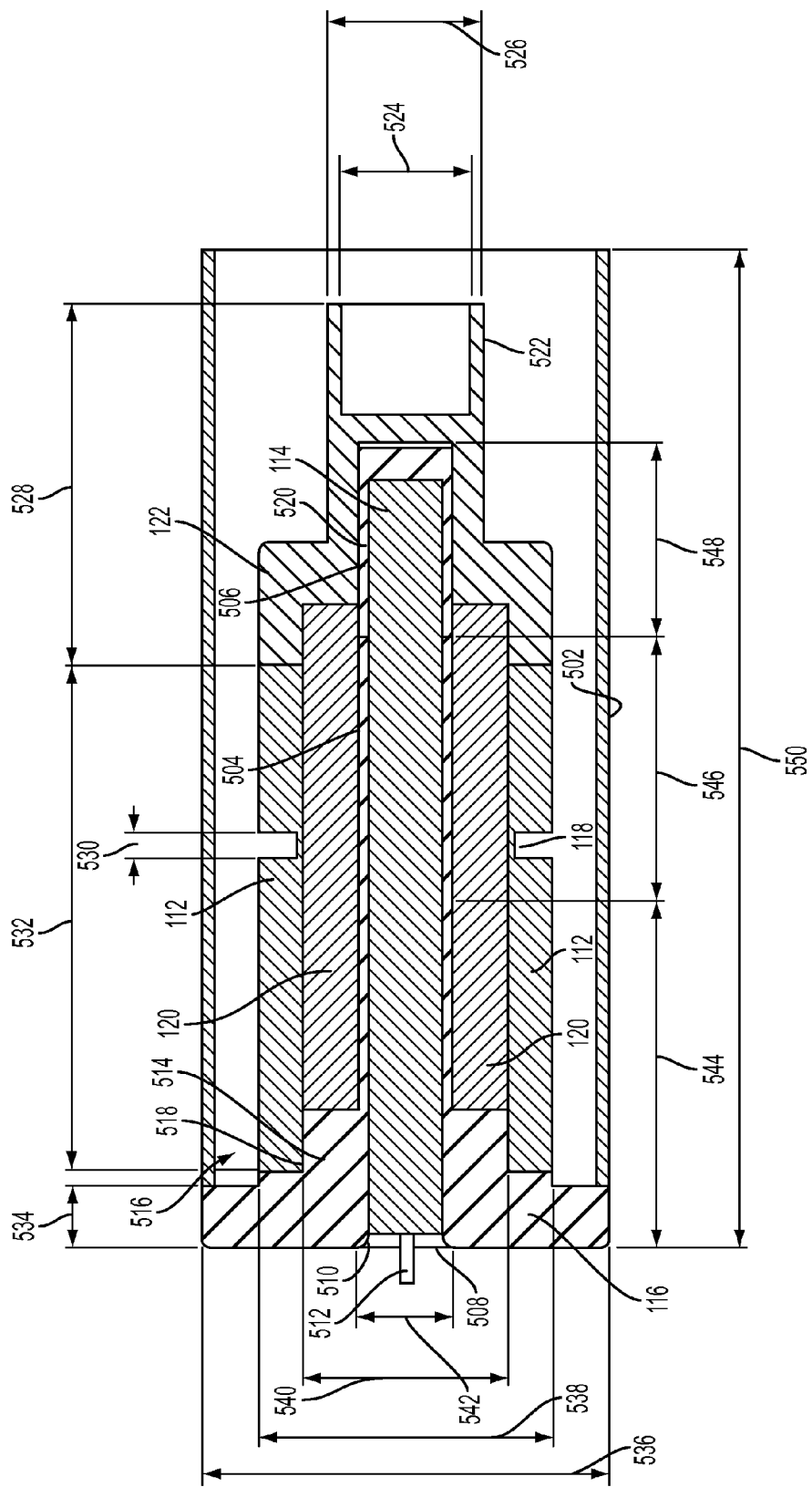
FIG. 5 illustrates a cross-sectional view of one embodiment of an actuator assembly incorporating aspects of the present disclosure.

Referring to FIG. 5, a cross-sectional view of one embodiment of the actuator assembly 500 for the valve assembly 100 of FIG. 1 is illustrated. In this example, the actuator assembly 500 includes the actuator tube 112, heater member 114, actuator end cap 116, actuator member 120 and stem cap 122. Also illustrated are the actuator body 502, heater sleeve 504 and heater sleeve cap 506. In one embodiment, with the exception of the heater 114 and actuator member 120, the parts of the actuator assembly 500 comprise 6AI-4V titanium, which provides a high strength-to-mass ratio and compatibility with propellants. In alternate embodiments, the actuator assembly 500 can comprise any suitable materials that provide high strength-to-mass ratio and compatibility with propellants.

The actuator end cap 116 is the part of the actuator assembly 500 that is farthest away from the valve cavity 102 shown in FIG. 1. In one embodiment, all of the tubular components of the actuator assembly 500 are welded to the actuator end cap 116. In alternate embodiments, the components can be coupled in any suitable manner. The through-hole 508 in the actuator end cap 116 is in-line with the hole 510 in the heater sleeve 504, which itself is welded to the actuator end cap 116. The through-hole 508 is open to the environment outside the valve assembly 100, but isolated from the interior of the valve assembly 100.

In one embodiment, the heater 114 is a cartridge heater. The heater 114, which in one embodiment is an approximately 3/16 inch cylindrical heating element, is disposed within the through-hole 508. The actuator member 120 is concentric to the heater sleeve 504. In one embodiment, the actuator member 120 when compressed, has an inner diameter of approximately 0.23 inches, and outer diameter of approximately 0.50 inches, and a length of approximately 1.00 inches. The placement of the heater 114 and the concentric actuator member 120 allows for radial heat conduction through the heater sleeve 504 and into the actuator member 120, which in this example is formed from nitinol. The aspects of the disclosed embodiments advantageously isolate the heater 114 from the inside of the valve assembly 100 and do not require the electrical leads 512 of the heater 114 to be placed through the wall of the valve assembly 100. This allows the electrical leads 512 of the heater 114 to be easily wired into the spacecraft electrical system.

In one embodiment, the actuator tube 112 is concentric to the actuator member 120 and is welded to the actuator end cap 116. The actuator tube 112 is a thick walled tube with a thickness of approximately 0.1 inches. An inner diameter of the actuator tube 112 is approximately 0.515 inches. A total length of the actuator tube 112 can be approximately 1.86 inches.

The following table illustrates exemplary dimensions for the lengths of the actuator end cap 116 and actuator member 120, pre and post-actuation and the length of the actuator tube 112, pre-actuation and at recovery.

|  | End Cap 116 & Actuator Member 120 (inches) | Actuator Tube 112 (inches) |
| --- | --- | --- |
| Pre-actuation | 1.150 | 1.153 |
| Post-actuation | 1.189 | 1.164 |
| Total Elongation | 0.039 | 0.011 |

In one embodiment, notched section of 118 of the actuator tube 112 is relatively thin-walled with a thickness of approximately 0.01 inches. A length of the notched section 118 is approximately 0.05 inches long. The notched section 118 is generally configured to provide a clean fracture with no particulates during activation.

The tubular design of the actuator assembly 500 provides for the heated sections of the actuator assembly 500, including the actuator member 120, heater sleeve 504 and heater 114 to be isolated from the propellant prior to fracturing of the notched section 118. Thus, the propellant will not experience any heating from the actuator member 120. As noted above, in the compressed state, the actuator member 120 is actuated via applied heat. In one embodiment, the actuator member 120 is thermally isolated from the rest of the spacecraft to ensure that heat conduction from other parts of the spacecraft does not cause premature actuation. The thermal isolation comes from the low thermal conductance of the titanium materials that make up the valve assembly 100.

In one embodiment, the actuation member 120 is surrounded by a vacuum prior to actuation. The vacuum ensures that no conduction or convection occurs. Also, any radiation heat transfer is insignificant due to the small thermal gradient of the valve assembly 100.

In the example of FIG. 5, in one embodiment, the actuator tube 112 is welded to the actuator end cap 116. To keep the actuator member 120 from heating to its transitional temperature during the welding process, the actuator member 120 is offset from the end of the actuator tube 112 where it is welded. As shown in FIG. 5, in one embodiment, the actuator end cap 116 includes a raised cylindrical section 514. The raised cylindrical section 514, also referred to as a spacer, offsets the actuator member 120 from the end 516 of the actuator tube 112 where it is welded to the actuator end cap 116. The offset 518 is sufficient to allow the weld to be made at a safe distance from the actuator member 120 to avoid premature actuation or recovery.

The stem cap 122 is a transition piece between the stem shaft 126 of the valve stem assembly 106 and the actuator tube 112. In one embodiment, approximately ¼ inch of the heater 114 inside the heater sleeve 504 is not heated. A small hole or recess 520 in the stem cap 122, with a length of approximately 0.32 inches, allows the heater sleeve 504 and the internal unheated section of the heater 114 to protrude into the stem cap 122. This allows the actuator member 120 to be in thermal contact with only the heated sections of the heater 114, maximizing the heat flux to the actuator member 120. The exemplary dimensions illustrated in the embodiment of FIG. 5 are set forth in the table below. All of the dimensions are approximate and in inches,

| | |
| --- | --- |
| 524 | 0.319 |
| 526 | 0.375 |
| 528 | 0.725 |
| 530 | 0.050 |
| 532 | 1.003 |
| 534 | 0.125 |
| 536 | 1.000 |
| 538 | 0.715 |
| 540 | 0.500 |
| 542 | 0.235 |
| 544 | 0.688 |
| 546 | 0.528 |
| 548 | 0.375 |
| 550 | 1.978 |

In one embodiment, the actuator cavity body 502 is substantially concentric to the entire actuator assembly 500. The actuator cavity body 502 can be welded to the actuator end cap 116 and the inlet valve plate 108. The length of the actuator cavity body 502 sets the initial deflection in the spring member 114 and its subsequent pro-load used to force the seat member 130 against the outlet interface 132 upon actuation.

Referring to FIGS. 1-5, in one embodiment, prior to actuation, a hydrostatic load of approximately 200 lbf is applied to the valve stem assembly 106 and the actuator assembly 500 by the pressurized incompressible propellant. This hydrostatic load resists the force of the spring member 104. Before actuation, the through-hole 125 in the inlet valve plate 108 shown in FIG. 1 allows the propellant to fill the cavity 111 between the actuator cavity body 502 and the actuator tube 112. Once the notched section 118 is fractured during actuation, the propellant in the cavity or void 111 is free to fill the volume inside the split actuator tube 112 and balance the hydrostatic forces on the stem shaft 126.

Figure 6A:
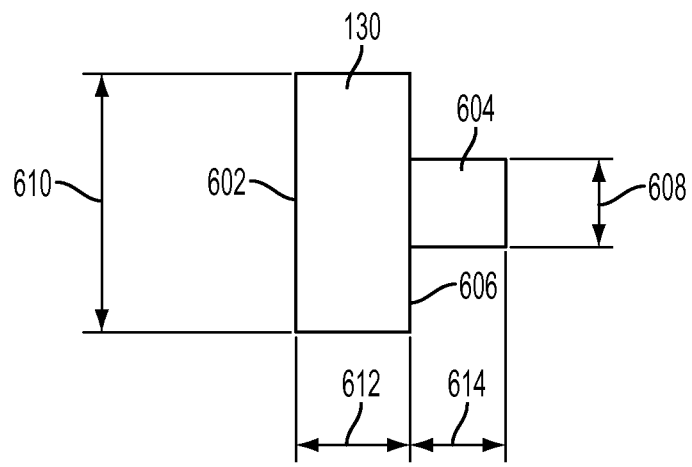
FIGS. 6A-6B illustrate one embodiment of a seat member incorporating aspects of the present disclosure.
Figure 6B:
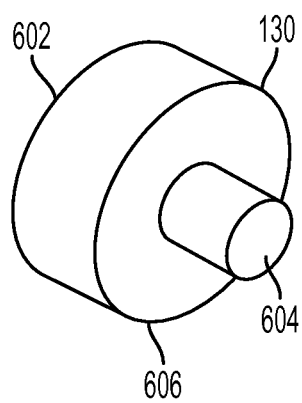

FIGS. 6A and 6B illustrates one embodiment of the seat member 130 of FIG. 1. In this example, the seat member 130 comprises a flat edge seat member. The flat edge seat member 130 generally comprises a substantially flat, disc shaped FEP seat machined from a rod stock FEP, and includes a substantially flat side or end 602 and a rod 604. The rod 604 extending from the end 606 of the seat member 130 is placed into the hole 129 in the spring cap 128, shown in FIG. 1, generally with an interference fit. Although the aspects of the disclosed embodiments are described herein with respect to a substantially flat end 602 of the seat member 130, the aspects of the disclosed embodiments are not so limited. In alternate embodiments, any suitable seal design is contemplated, such as for example, a conical seat design. The exemplary dimensions illustrated in the embodiment of FIG. 6 are set forth in the table below. All of the dimensions are approximate and in inches.

| | |
|---|---|
| 608 | 0.250 |
| 610 | 0.750 |
| 612 | 0.300 |
| 614 | 0.250 |

Figure 7:
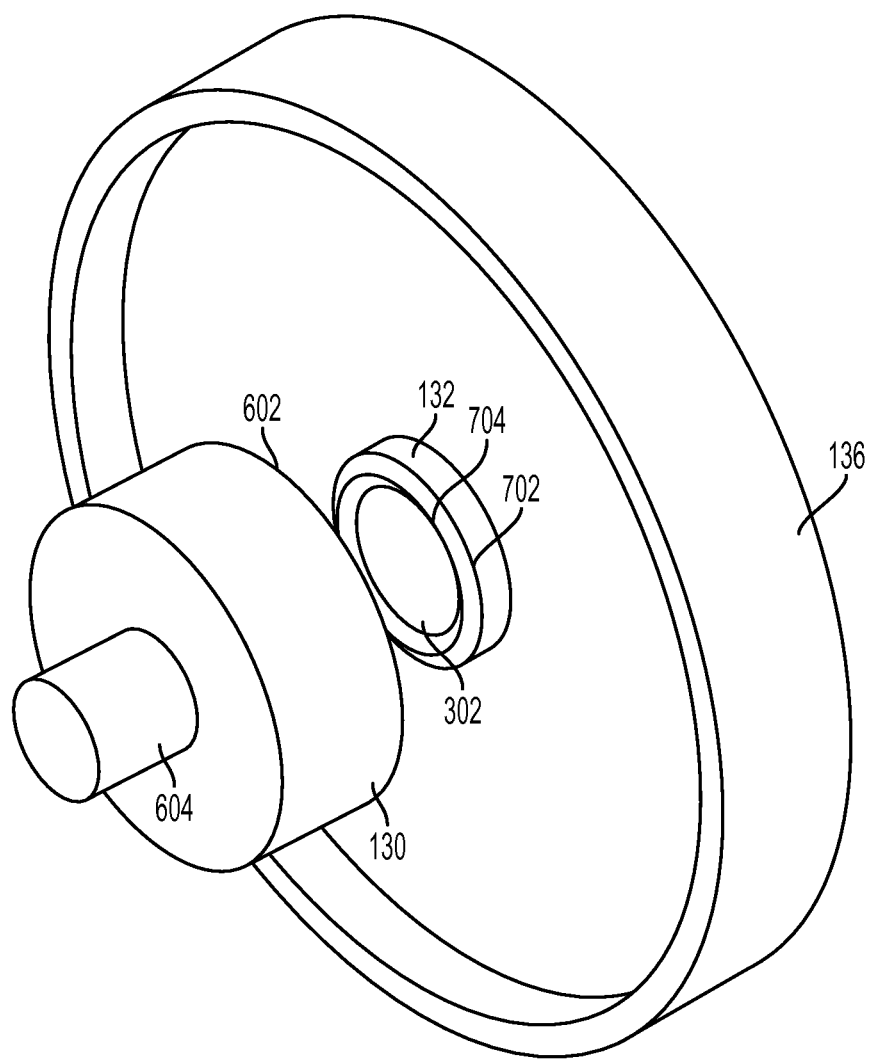
FIG. 7 illustrates a perspective view of one embodiment of the seat member and outlet interface in a valve assembly incorporating aspects of the present disclosure.

Referring to FIG. 7, the outlet tube interface 132 of the outlet valve plate 136 has a raised sharp edge ring member 702 that runs around the circumference of the outlet tube opening 302, illustrated in FIG. 3. The diameter of the face or end 602 of the seat member 130 that contacts the outlet interface 132 is larger than the outlet interface 132. The larger diameter ensures that the seat member 130 contacts the entire area of the raised ring 702 even if some radial float occurs as the stem shaft 126 slides toward the outlet valve plate 136 during actuation.

The seal is created by pressing the substantially flat side 602 of the seat member 130 against the outlet interface 132 when the valve assembly 100 is actuated. The raised or sharp edge ring 702 of the outlet interface 132 shown in FIG. 7 digs into the seat member 130, creating a seal. In one embodiment, a front portion or edge 704 of the raised ring member 702 has a bulbous semicircular cross-section. The FEP material of the seat member 130 is a soft material relative to the titanium of the outlet interface 132. Thus, the seat member 130 is easily deformed as the spring 114 force presses the seat member 130 against the much harder outlet interface 132. The FEP material of the seat member 130 will fill any surface defects in the titanium of the outlet interface 132, effectively sealing all fluid flow pathways. Due to the small area of the seat member 130 that is in contact with the outlet interface 132, a relatively small force is required to obtain the necessary elastic deformation in the seat member 130 to achieve a leak-tight seal. In one embodiment, the force required to create a seal is approximately 3.52 lbf, requiring 1.6 µm of deflection in the FEP material over the face 602 of the seat member 130 in contact with the ring member 702. The surface area of the ring member 702 is large enough so that when it comes into contact with and deforms the face 602 of the seat member 130, the seat member 130 only deforms elastically.

In one embodiment, the spring member 104 comprises a die spring. The table below provides exemplary parameters for the spring member 104.

| Design | Flat Seal Design |
|---|---|
| Spring Constant, k (lbf/in) | 232 |
| Free Length (in) | 2.000 |
| Pre-actuation Length (in) | 1.284 |
| Pre-actuation force (lbf) | 166.1 |
| Post-actuation Length (in) | 1.784 |
| Post-actuation Force (lbf) | 50.1 |
| Additional Available Deflection (in) | 0.284 |
| Rod Size (in) | 0.375 |
| Cup Size (in) | 0.750 |

The length of the spring member 104 generally defines the length of the valve cavity tube 102. In the example of FIG. 1, the spring member 104 has a rod size of approximately 0.375 inches. The size of the retaining cup 522 illustrated in FIG. 5, defines the diameter of the spring cap 122 at the end of the stem shaft 126. The retaining cup 107 on the inlet valve plate 108 ensures that the spring member 104 remains in the correct position.

In one embodiment, the stem shaft 126 is a hollow tube to minimize its mass. An outer diameter of the stem shaft 126 can be approximately 0.375 inches, while a wall thickness of the stem shaft 126 can be approximately 0.028 inches.

The stem cap 122 comprises the transition point between the actuator tube 112 and the stem shaft 126. The stem cap 122 serves as the bottom of the stem shaft assembly and the top of the actuator tube 112. The top 802 of the stem cap 122 is a tube with dimensions that are substantially identical to that of the stem shaft 126. In one embodiment, an outer diameter is approximately 0.375 inches, a wall thickness is approximately 0.028 inches and a length is approximately 0.375 inches. The length provides ample clearance for the GTAW weld head used to integrate the stem cap 122 to the stem shaft 126. The stem cap 122 then opens up to a 0.35 inches length tube with the same diameter as the actuator tube 112 with an outer diameter of approximately 0.715 inches and a wall thickness of approximately 0.1 inches.

The spring cap 128 is the transition point between the stem shaft 126 and the seat member 130. The spring cap 128 provides a rigid surface for the spring member 104 to contact, since the spring member 104 is disposed between the spring cap 128 and the inlet valve plate 108. As shown in FIG. 1, in one embodiment, the seat member 130 is integrated into the end of the spring cap 128. The bottom 127 of the spring cap 128 has substantially identical dimensions to that of the stem shaft 126, with an outer diameter of approximately 0.375 inches, wall thickness of approximately 0.028 inches and a length of approximately 0.375 inches. The length of the bottom 127 of the spring cap 128 provides clearance for the GTAW weld head used to integrate the stem shaft 126 to the spring cap 128.

The other end 131 of the spring cap 128 has a diameter of approximately 0.75 inches and a length of approximately 0.375 inches. These dimensions coupled with the matching dimensions of the inlet valve plate 108 ensures that the ends of the spring 104 have a solid contact surface to contact with no overhand and minimum radial play. A bore hole 129 is placed into the front of the spring cap 128 with a nominal diameter of approximately 0.25 inches and a depth of approximately 0.25 inches. The seat member 130 is placed into this hole 129 with an interference fit.

Figure 8A:
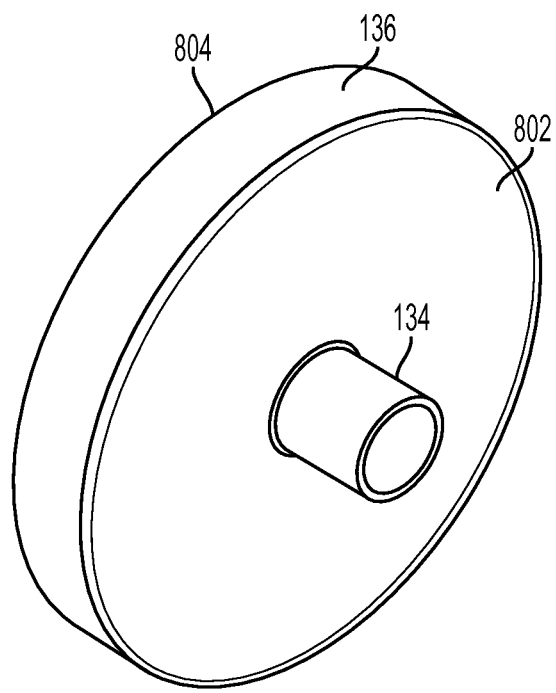
FIGS. 8A-8C illustrate one embodiment of an outlet interface for a valve assembly incorporating aspects of the present disclosure.
Figure 8B:
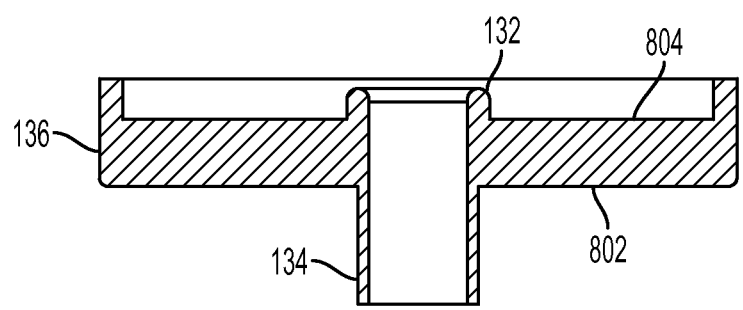
Figure 8C:
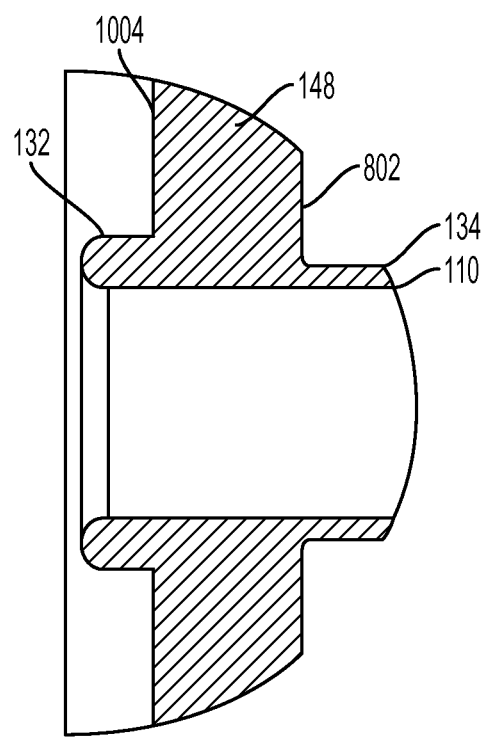

FIGS. 8A-8C illustrate one embodiment of an outlet valve plate 136 for a valve assembly 100. The valve outlet plate 136 is the interface between the outlet tube 134 on one side 802 and the outlet interface 132 on the opposite side 804. The thickness of the valve outlet plate 136 is substantially the same as the thickness of the inlet valve plate 108. In one embodiment, the thickness is approximately 0.2 inches. This thickness is sufficient to sustain the bending moment caused by the spring force without yielding. In one embodiment, the outlet tube 134 can be welded to and protrudes out of the outlet plate 136. The end 101 of the valve cavity tube 102 shown in FIG. 1 is welded to the outlet valve plate 136 to seal the valve cavity 103 from the outside environment.

Figure 9A:
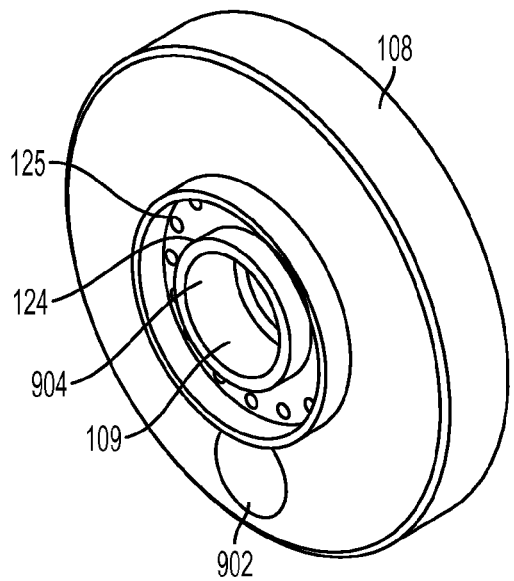
FIGS. 9A-9C illustrate one embodiment of an inlet valve plate for a valve assembly incorporating aspects of the present disclosure.
Figure 9B:
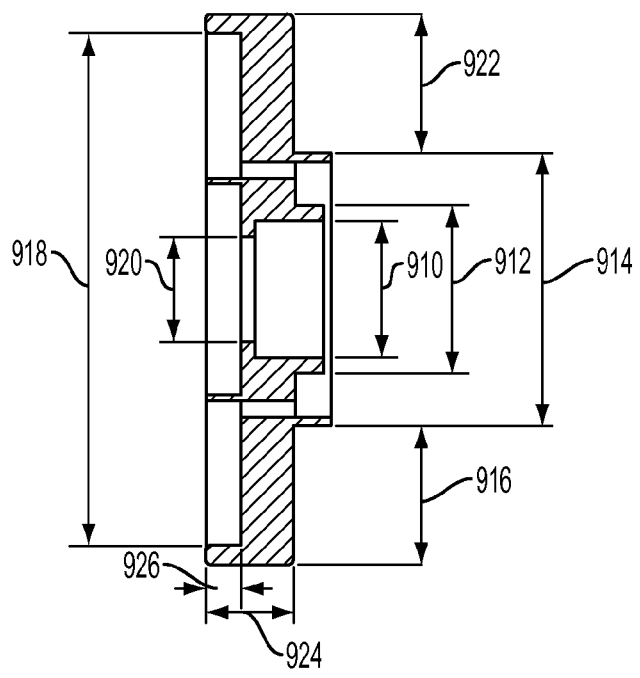
Figure 9C:
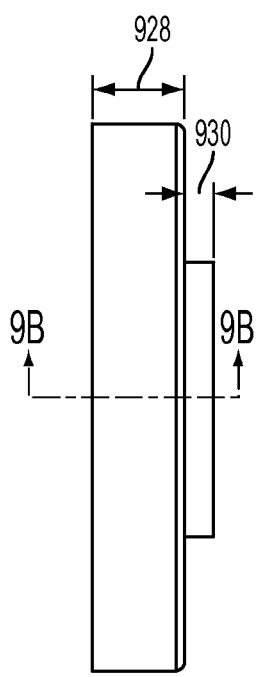

FIGS. 9A-9C illustrate one embodiment of the inlet valve plate 108. The inlet valve plate 108 has a thickness of approximately 0.2 inches. This thickness is sufficient to sustain the bending moment caused by the spring force without yielding. The inlet valve plate 108 has a nominal 0.5 inch diameter through-hole 109. The bushing 124 shown in FIG. 1 is placed inside this hole 109 with an approximately 3/1000" interference fit. The bushing 124 is used to guide the stem shaft 126 into the outlet interface 132 during actuation. Sixteen 0.0625 inch diameter holes 125 are bored into the inlet plate 108 to allow propellant to fill the actuator cavity 111. Once actuated and the notch 118 is fractured, the propellant is free to fill inside the fractured actuator tube 112 behind the stem shaft 126 to balance the hydrostatic force due to the pressured incompressible propellant. The inlet valve plate 108 includes an opening or recess 902 in which the inlet tube 110 is received. In one embodiment, the inlet tube 110 has a diameter of approximately 0.375 inch with 0.028 inch wall thickness. The inlet tube 110 can be welded to and protrude out of the inlet plate 108. The valve cavity tube 102 (2.0 inch OD with 0.064 inch wall thickness) is welded to inlet valve plate 108.

A linear bushing 124 is used between the stem shaft 126 and valve stem inlet plate 108. The bushing 124 is configured to reduce the coefficient of friction at the valve stem inlet plate interface 904, reducing the resistance the spring 104 must overcome during actuation, for a tighter tolerance around the stem shaft 126, which will reduce the radial float of the stem shaft 126 during actuation.

In one embodiment, the linear bushing 124 is made from Rulon, is approximately 0.25 inches long, with an outer diameter of approximately 0.5 inches and an inner diameter of approximately 3/8 inches. The diametrical clearance between the valve stem shaft 126 and the inner diameter of the linear bushing 124 will be approximately 3/1000 of an inch. The linear bushing 124 will be placed in the inlet plate 108 with an FN 1 interference fit. This fit applies a maximum of 531 psi of compressive stress on the linear bushing 124, which is below its compressive yield strength of approximately 1000 psi.

The exemplary dimensions illustrated in the embodiment of FIGS. 9B and 9C are set forth in the table below. All of the dimensions are approximate and in inches.

| | |
|---|---|
| 910 | 0.500 |
| 912 | 0.600 |
| 914 | 1.000 |
| 916 | 0.500 |
| 918 | 1.872 |

-continued

| | |
|---|---|
| 920 | 0.375 |
| 922 | 0.500 |
| 924 | 0.300 |
| 926 | 0.125 |
| 928 | 0.325 |
| 930 | 0.125 |

Figure 10A:
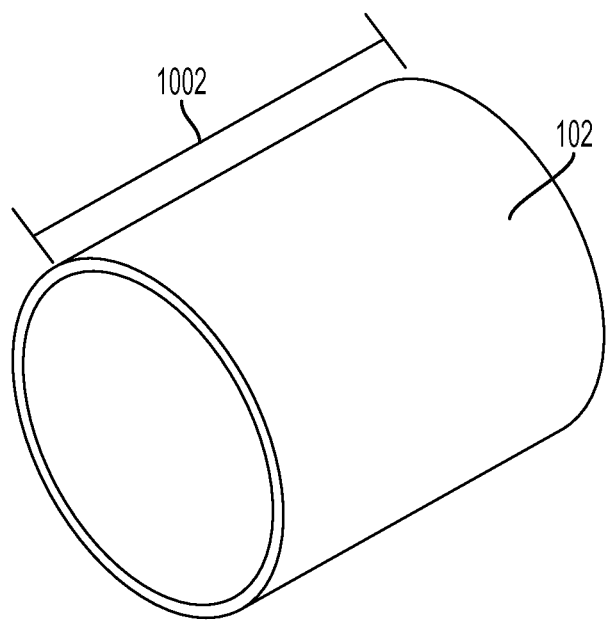
FIGS. 10A-10B illustrate one embodiment of a valve body for a valve assembly incorporating aspects of the present disclosure.
Figure 10B:
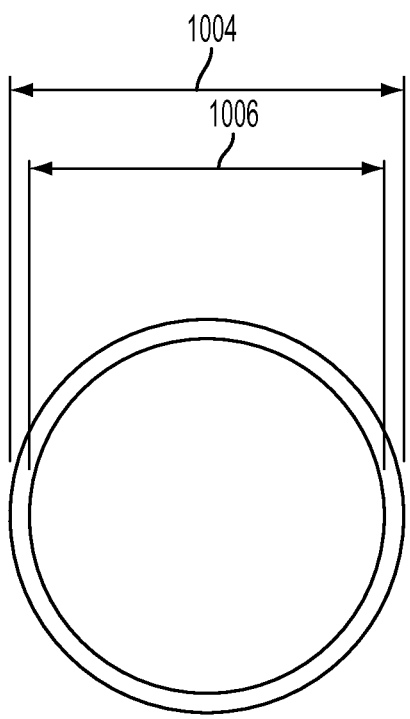

FIGS. 10A-10B illustrates one embodiment of the valve cavity body or tube 102. The valve cavity tube 102 isolates the main internal section of the valve or valve cavity 103 from the outside environment. In one embodiment, the valve cavity tube 102 has an outer diameter of approximately 2.0 inches, a wall thickness of approximately 0.028 inches, and a length of approximately 2.305 inches. In alternate embodiments, any suitable dimensions for the valve cavity tube 102 can be used. The diameter of the valve cavity tube 102 is chosen to meet the pressure drop requirements. The length of the valve cavity tube 102 sets the initial separation between the seat 130 and the outlet interface 136, or the stroke length of the valve assembly 106. In one embodiment, the total length of the valve cavity tube 102 is equal to the sum of the pre-actuation length of the spring 104, the length of spring cap 128, the length of the seat 130 and the stroke length. In the example of FIG. 1, this length is approximately 2.555 inches.

The exemplary dimensions illustrated in the embodiment of FIGS. 10A-10B are set forth in the table below. All of the dimensions are approximate and in inches.

| | |
|---|---|
| 1002 | 2.305 |
| 1004 | 2.000 |
| 1006 | 1.872 |

Figure 11A:
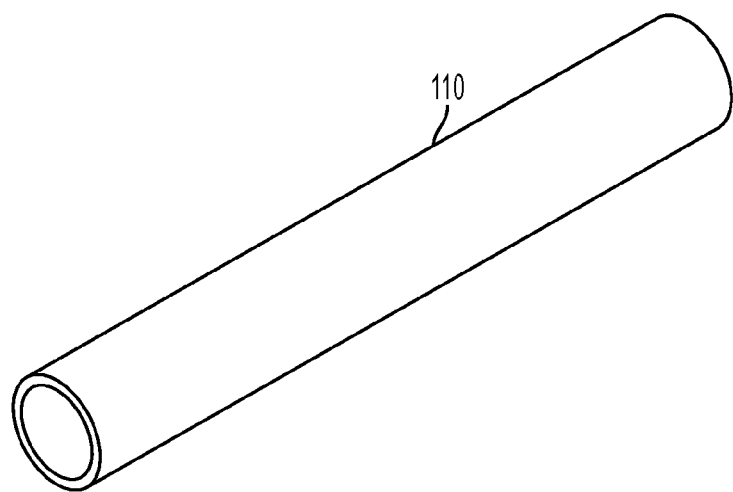
Figure 11B:
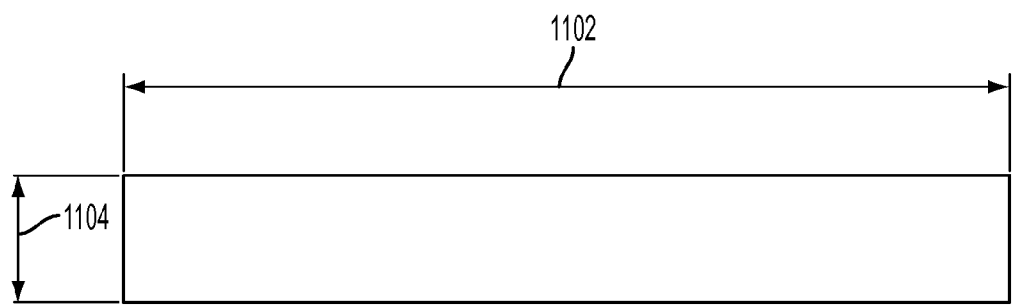
Figure 11C:
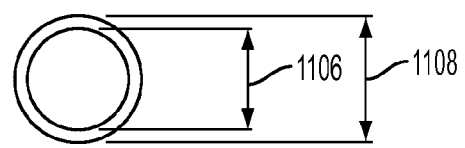

FIGS. 11A-11C illustrate one embodiment of the inlet tube 110. The outlet tube 134 of FIG. 1 looks substantially the same. In one embodiment, the diameter and wall thickness of both the inlet tube 110 and the outlet tube 134 are approximately 0.375 inches and 0.028 inches, respectively. The inlet and outlet tubes 110, 134 can have lengths of approximately 2.7 inches and 0.3125 inches respectively. This length allows the valve assembly 100 to be easily integrated into propellant lines of a propulsion system using the gaseous tungsten arc welder typically used in spacecraft integration. The diameter of 0.375 inches is typical of spacecraft propellant lines. In alternate embodiments, the valve assembly 100 can be used with other sized propellant lines with the use of transition tubes that neck up or down to the necessary tubing diameter and wall thickness.

The exemplary dimensions illustrated in the embodiment of FIGS. 11A-11C are set forth in the table below. All of the dimensions are approximate and in inches.

| | |
|---|---|
| 1102 | 2.700 |
| 1104 | 0.375 |
| 1106 | 0.319 |
| 1108 | 0.375 |

The wall thicknesses of the valve assembly 100 are derived from the burst pressure requirement (1250 psi). At this pressure, the required wall thickness-to-radius is 0.01. The following table shows the wall thickness of each tubular section of the valve assembly 100 and its respective safety factor.

| Part | Radius, r (in) | Thickness, t (in) | Required Thickness (in) | Safety Factor |
|---|---|---|---|---|
| Valve Body/Cavity Tube 102 | 1.00 | 0.064 | 0.01 | 6.4 |
| Actuator Body/Cavity Tube 502 | 0.5 | 0.032 | 0.005 | 6.4 |
| Heater Sleeve 504 | 0.115 | 0.02275 | 0.00115 | 19.8 |
| Inlet/Outlet Tubes 110/134 | 0.1875 | 0.028 | 0.001875 | 14.93 |
| Stem Shaft 126 | 0.250 | 0.028 | 0.0025 | 11.2 |
| Notch 118 | 0.2675 | 0.010 | 0.002675 | 3.74 |
| Actuator Tube 112 | 0.3575 | 0.100 | 0.003575 | 27.97 |

All safety factors are greater than 1 to ensure that no components will fail at the burst pressure. The thin wall thicknesses minimize mass of the valve assembly 100.

The aspects of the disclosed embodiments provide a normally open permanent isolation valve for an in-space propulsion system. In one embodiment, the valve assembly 100 can be used as a drop in replacement for the currently used pyrovalve. The actuator 120 comprises a compressed hollow cylinder of nitinol and a cartridge housing placed concentrically inside the actuator cavity body 502. A spring 104 of the valve assembly 100 is compressed between the valve body 102 and an end of the valve stem 126 that includes a seat or seal 130. When the actuator 120 is actuated, the spring 104 expands driving the seat 130 into an outlet interface 136, sealing the valve assembly 100. The seat 130 is a fluorinated ethylene propylene (FEP) seal that is pressed against a bulbous annulus at the outlet interface 136 of the valve assembly 100. The valve assembly 100 of the disclosed embodiments thus provides a leak-tight seal without the use explosive actuators and is generally compatible with all storable propellants.

Thus, while there have been shown, described and pointed out, fundamental novel features of the invention as applied to the exemplary embodiments thereof it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A valve assembly for an in-space propulsion system, comprising:
   an inlet tube;
   an outlet tube;
   a valve body coupling the inlet tube to the outlet tube and defining a propellant flow path;
   a valve stem assembly disposed within the valve body;
   an actuator body coupled to the valve body, the valve stem assembly extending from an interior of the valve body to an interior of the actuator body;
   an actuator assembly disposed within the actuator body and coupled to the valve stem assembly, the actuator assembly comprising a shape memory actuator member that when heated to a transition temperature is configured to enable the valve stem assembly to engage the outlet tube and seal the propellant flow path; and
   a spring member disposed along the valve stem assembly between a seat member of the valve stem assembly and the valve body, the spring member being retained in a compressed state between the seat member and the valve body;
   wherein the actuator assembly comprises an actuator tube assembly housing the shape-memory actuator member, the actuator tube assembly being coupled to the actuator body on one end and the valve stem assembly on another end.

2. The valve assembly of claim 1, the actuator tube assembly including a notched section, a first portion of the actuator tube assembly on one side of the notched section being coupled to the actuator body, a second portion of the actuator tube assembly on another side of the notched section being coupled to the valve stem assembly, the notched section configured to fracture to release the coupling of the valve stem assembly from the actuator body through the actuator tube assembly.

3. The valve assembly of claim 1, wherein the spring member is configured to expand when a notched section fractures and drive the seat member towards the outlet tube to seal the flow path.

4. The valve assembly of claim 1, wherein the outlet tube comprises an outlet interface that is configured to mate with the seat member and form a leak tight seal in the flow path.

5. The valve assembly of claim 4, wherein the outlet interface comprises a raised member that is configured to sealingly engage a face of the seat member.

6. The valve assembly of claim 1, comprising a heater member disposed within the actuator tube assembly and configured to heat the shape memory actuator member.

7. A valve assembly for an in-space propulsion system, comprising:
   an inlet tube;
   an outlet tube;
   a valve body coupling the inlet tube to the outlet tube and defining a propellant flow path;
   a valve stem assembly disposed within the valve body;
   an actuator body coupled to the valve body, the valve stem assembly extending from an interior of the valve body to an interior of the actuator body;
   an actuator assembly disposed within the actuator body and coupled to the valve stem assembly, the actuator assembly comprising a shape memory actuator member that when heated to a transition temperature is configured to enable the valve stem assembly to engage the outlet tube and seal the propellant flow path; and
   an inlet valve plate coupled to an end of the valve body between the valve body and the actuator body, the inlet valve plate securing the actuator body to the valve body, the inlet valve plate comprising a through hole to allow a flow of propellant from the interior of the valve body to the interior of the actuator body.

8. The valve assembly of claim 7, wherein the shape memory actuator member comprises a NITINOL-nickel titanium shape memory alloy member.

9. A normally open shape memory valve assembly for a spacecraft fluid system comprising:
  a valve body defining a fluid flow path between an inlet and an outlet;
  an actuator body coupled to the valve body, an actuator tube and a shape memory alloy retained within the actuator tube being disposed in the actuator body;
  a valve stem assembly extending from an interior of the valve body into an interior of the actuator body, the valve stem assembly comprising a stem cap, a seat member, and a stem shaft coupled between the stem cap and the seat member;
  a spring member disposed on the stem shaft, the spring member being configured to be retained in a compressed state between the valve body and the seat member;
  a first end of the actuator tube being coupled to the stem cap and a second end of the actuator tube being coupled to the actuator body; and
  a heater member retained within the actuator tube adjacent to the shape memory alloy, the heater member configured to heat the shape memory alloy to allow the shape memory alloy to expand and separate the first end of the actuator tube from the second end, enabling the spring member to drive the seat member against the outlet and seal the flowpath.

10. The normally open shape memory valve assembly of claim 9, wherein when the spring member is in a compressed state, the seat member is positioned away from the outlet.

11. The normally open shape memory valve assembly of claim 9, wherein the actuator tube comprises a fracturable notched section between the first end and the second end, and the expansion of the shape memory alloy fractures the notched section to separate the first end from the second end.

12. The normally open shape memory valve assembly of claim 11, wherein the fracturable notched section couples the first end of the actuator tube to the second end of the actuator tube to retain the spring member in the compressed state.

13. The normally open shape memory valve assembly of claim 9, wherein a wall of the valve body includes an opening to allow the passage of the stem shaft between the valve body and the actuator body and a through hole to allow a passage of fluid from the valve body into the actuator body.

14. The normally open shape memory valve assembly of claim 9, wherein the outlet comprises a ringed member extending away from the outlet and configured to engage the seat member and seal the outlet in a non-compressed state of the spring member.

15. The normally open shape memory valve assembly of claim 9, wherein the second end of the actuator tube comprises a raised cylindrical portion separating the shape memory alloy from a weld point on the second end of the actuator tube.

16. The normally open shape memory valve assembly of claim 9, wherein the valve stem assembly comprises a spring cap between the spring member and the seat member, the spring cap being fixedly secured to the stem shaft and the seat member retained by the spring cap.

17. The normally open shape memory valve assembly of claim 16, wherein the spring cap comprises a titanium alloy and the seat member comprises a fluorinated ethylene propylene material.

18. The normally open shape memory valve assembly of claim 9, wherein the shape memory alloy is NITINOL-nickel titanium.

* * * * *